US011869132B2

(12) United States Patent
Kim et al.

(10) Patent No.: US 11,869,132 B2
(45) Date of Patent: Jan. 9, 2024

(54) NEURAL NETWORK BASED 3D OBJECT SURFACE MAPPING

(71) Applicants: Adobe Inc., San Jose, CA (US); UCL Business Ltd., London (GB)

(72) Inventors: Vladimir Kim, Seattle, WA (US); Noam Aigerman, San Francisco, CA (US); Niloy J. Mitra, Potters Bar (GB); Luca Morreale, London (GB)

(73) Assignees: Adobe Inc., San Jose, CA (US); UCL Business Ltd., London (GB)

( * ) Notice: Subject to any disclaimer, the term of this patent is extended or adjusted under 35 U.S.C. 154(b) by 17 days.

(21) Appl. No.: 17/537,343

(22) Filed: Nov. 29, 2021

(65) Prior Publication Data
US 2023/0169714 A1 Jun. 1, 2023

(51) Int. Cl.
*G06T 17/20* (2006.01)
*G06T 15/04* (2011.01)
*G06N 3/08* (2023.01)
*G06N 3/045* (2023.01)

(52) U.S. Cl.
CPC ............. *G06T 15/04* (2013.01); *G06N 3/045* (2023.01); *G06N 3/08* (2013.01); *G06T 17/20* (2013.01)

(58) Field of Classification Search
None
See application file for complete search history.

(56) References Cited

U.S. PATENT DOCUMENTS

| 2008/0106547 | A1* | 5/2008 | Kataoka | G06T 17/20 703/6 |
| 2009/0213131 | A1* | 8/2009 | DeRose | G06T 17/20 345/581 |
| 2010/0053172 | A1* | 3/2010 | DeRose | G06T 17/20 345/473 |
| 2019/0087957 | A1* | 3/2019 | Burris | G16H 50/50 |
| 2019/0336220 | A1* | 11/2019 | Hladio | A61B 34/10 |
| 2020/0320386 | A1* | 10/2020 | Filippov | G06T 17/20 |
| 2021/0350620 | A1* | 11/2021 | Bronstein | G06N 20/00 |
| 2022/0020195 | A1* | 1/2022 | Kuta | G06V 40/168 |

(Continued)

OTHER PUBLICATIONS

Groueix, Thibault, et al. "3d-coded: 3d correspondences by deep deformation." Proceedings of the european conference on computer vision (ECCV). 2018.*

(Continued)

*Primary Examiner* — Sultana M Zalalee
(74) *Attorney, Agent, or Firm* — Kilpatrick Townsend & Stockton LLP

(57) ABSTRACT

Certain aspects and features of this disclosure relate to neural network based 3D object surface mapping. In one example, a first representation of a first surface of a first 3D object and a second representation of a second surface of a second 3D object are produced. A surface mapping function is generated for mapping the first surface to the second surface. The surface mapping function is defined the representations and by a neural network model configured to map a first 2D representation of the first surface to a second 2D representation of the second surface. One or more features of the a first 3D mesh on the first surface can be applied to a second 3D mesh on the second surface using the surface mapping function to produce a modified second surface, which can be rendered through a user interface.

20 Claims, 7 Drawing Sheets

(56) References Cited

U.S. PATENT DOCUMENTS

| | | | |
|---|---|---|---|
| 2022/0027720 A1* | 1/2022 | Lysenkov | G06T 15/04 |
| 2022/0122250 A1* | 4/2022 | Besson | G06T 7/0012 |
| 2023/0044644 A1* | 2/2023 | Elbaz | G06T 9/002 |
| 2023/0132479 A1* | 5/2023 | Karanam | G06T 17/20 |
| | | | 345/419 |

OTHER PUBLICATIONS

Achlioptas et al., Learning Representations and Generative Models for 3D Point Clouds, Cornell University, Computer Science, Jun. 12, 2018, 18 pages.
Aigerman et al., Hyperbolic Orbifold Tutte Embeddings, ACM Transactions on Graphics, vol. 35, No. 6, Nov. 2016, pp. 1-14.
Aigerman et al., Lifted Bijections for Low Distortion Surface Mappings, ACM Transactions on Graphics, vol. 33, No. 4, Jul. 2014, pp. 1-12.
Aigerman et al., Orbifold Tutte Embeddings, ACM Transactions on Graphics, vol. 34, No. 6, Nov. 2015, pp. 1-12.
Aigerman et al., Seamless Surface Mappings, ACM Transactions on Graphics, vol. 34, No. 4, Aug. 2015, pp. 1-13.
Atzmon et al., SAL: Sign Agnostic Learning of Shapes from Raw Data, Proceedings of the IEEE/CVF Conference on Computer Vision and Pattern Recognition, 2020, pp. 2565-2574.
Atzmon et al., SALD: Sign Agnostic Learning with Derivatives, arXiv preprint arXiv:2006.05400, Available Online at: https://arxiv.org/pdf/2006.05400.pdf, 2020, 14 pages.
Bednarik et al., Shape Reconstruction by Learning Differentiable Surface Representations, Proceedings of the IEEE/CVF Conference on Computer Vision and Pattern Recognition, 2020, pp. 4716-4725.
Ben-Hamu et al., Multi-chart Generative Surface Modeling, ACM Transactions on Graphics (TOG), vol. 37, No. 6, Nov. 2018, pp. 215:1-215:15.
Bommes et al., Quad-mesh Generation and Processing: A Survey, Computer Graphics, vol. 32, No. 6, Sep. 2013, pp. 51-76.
Bradley et al., Markerless Garment Capture, ACM Transactions on Graphics, vol. 27, No. 3, Aug. 2008, pp. 1-9.
Brock et al., Generative and Discriminative Voxel Modeling with Convolutional Neural Networks, CoRR, abs/1608.04236, 2016, 9 pages.
Cybenko, Approximation by Superpositions of a Sigmoidal Function, Mathematics of Control, Signals, and Systems, vol. 2, No. 4, 1989, pp. 303-314.
Dai et al., Scan2Mesh: From Unstructured Range Scans to 3D Meshes, IEEE/CVF Conference on Computer Vision and Pattern Recognition (CVPR), 2019, 10 pages.
Dai et al., Shape Completion Using 3D-encoder-predictor CNNs and Shape Synthesis, Proceedings of Computer Vision and Pattern Recognition (CVPR), 2017, 14 pages.
Davies et al., Overfit Neural Networks as a Compact Shape Representation, arXiv:2009.09808v2, 2020, pp. 1-9.
Deprelle et al., Learning Elementary Structures for 3D Shape Generation and Matching, arXiv preprint arXiv:1908.04725, 2019, 11 pages.
Donati et al., Deep Geometric Functional Maps: Robust Feature Learning for Shape Correspondence, Proceedings of the IEEE/CVF Conference on Computer Vision and Pattern Recognition, 2020, pp. 8592-8601.
Floater, One-to-one Piecewise Linear Mappings Over Triangulations, Mathematics of Computation, vol. 72, No. 242, Oct. 17, 2002, pp. 685-696.
Floater et al., Surface Parameterization: A Tutorial and Survey, Advances in Multiresolution for Geometric Modelling, 2005, pp. 157-186.
Girdhar et al., Learning a Predictable and Generative Vector Representation for Objects, Computer Vision and Pattern Recognition (cs.CV), ECCV, Available Online at: https://arxiv.org/abs/1603.08637, Aug. 31, 2016, 26 pages.
Gortler, Discrete One-forms on Meshes and Applications to 3D Mesh Parameterization, Computer Aided Geometric Design, vol. 23, No. 2, Feb. 2006, pp. 83-112.
Gropp et al., Implicit Geometric Regularization for Learning Shapes, arXiv preprint arXiv:2002.10099, 2020, 14 pages.
Groueix et al., A Papier-Mache Approach to Learning 3D Surface Generation, Cornell University, Computer Science; Computer Vision and Pattern Recognition, Accessed from internet on Mar. 18, 2020, 16 pages.
Ha et al., HyperNetworks, Available Online at : https://arxiv.org/abs/1609.09106, Dec. 1, 2016, 29 pages.
Haim et al., Surface Networks via General Covers, Proceedings of the IEEE International Conference on Computer Vision, 2019, pp. 632-641.
Hanocka et al., MeshCNN: A Network with an Edge, ACM Transactions on Graphics (TOG), vol. 38, No. 4, Jul. 2019, pp. 1-12.
Huang et al., Consistent Shape Maps via Semidefinite Programming, Computer Graphics Forum, vol. 32, Oct. 15, 2013, pp. 177-186.
Kazhdan et al., Can Mean-curvature Flow Be Modified to Be Non-singular?, arXiv:1203.6819, Available Online at: https://arxiv.org/pdf/1203.6819.pdf, 2012, 9 pages.
Kraevoy et al., Cross-Parameterization and Compatible Remeshing of 3D Models, ACM Transactions on Graphics, vol. 23, No. 3, Aug. 2004, pp. 861-869.
Lee et al., Multiresolution Mesh Morphing, Proceedings of the 26th Annual Conference on Computer Graphics and Interactive Techniques, SIGGRAPH '99, Aug. 1999, pp. 343-350.
Levy et al., Least Squares Conformal Maps for Automatic Texture Atlas Generation, ACM Transactions on Graphics, vol. 21, No. 3, Jul. 2002, pp. 362-371.
Lipman, Bounded Distortion Mapping Spaces for Triangular Meshes, ACM Transactions on Graphics, vol. 31, No. 4, Jul. 2012, 13 pages.
Litany et al., Deep Functional Maps: Structured Prediction for Dense Shape Correspondence, Proceedings of the IEEE international conference on computer vision, 2017, 9 pages.
Littwin et al., Deep Meta Functionals for Shape Representation, Proceedings of the IEEE/CVF International Conference on Computer Vision, 2019, pp. 1824-1833.
Liu et al., Interactive 3D Modeling with a Generative Adversarial Network, International Conference on 3D Vision (3DV), 2017, 9 pages.
Liu et al., Neural Subdivision, arXiv preprint arXiv:2005.01819, 2020, 16 pages.
Loshchilov, SGDR: Stochastic Gradient Descent with Warm Restarts, arXiv preprint arXiv:1608.03983, 2017, 16 pages.
Maron et al., Convolutional Neural Networks on Surfaces via Seamless Toric Covers, Journal ACM Transactions on Graphics, vol. 36, No. 4, Jul. 2017, pp. 71:1-71:10.
Mildenhall et al., NeRF: Representing Scenes as Neural Radiance Fields for View Synthesis, European Conference on Computer Vision, Aug. 3, 2020, pp. 1-25.
Myles et al., Global Parametrization by Incremental Flattening, ACM Transactions on Graphics (TOG), vol. 31, No. 4, Jul. 2012, pp. 1-11.
Nguyen et al., An Optimization Approach to Improving Collections of Shape Maps, Computer Graphics Forum, vol. 30, No. 5, Aug. 2011, pp. 1481-1491.
Ovsjanikov et al., Functional Maps: A Flexible Representation of Maps Between Shapes, ACM Transactions on Graphics (TOG), vol. 31, No. 4, Jul. 2012, pp. 1-11.
Park et al., DeepSDF: Learning Continuous Signed Distance Functions for Shape Representation, Proceedings of the IEEE/CVF Conference on Computer Vision and Pattern Recognition, 2019, 19 pages.
Pinkall et al., Computing Discrete Minimal Surfaces and their Conjugates, Experimental Mathematics, vol. 2, No. 1, 1993, pp. 15-36.
Poursaeed et al., Coupling Explicit and Implicit Surface Representations for Generative 3D Modeling, European Conference on Computer Vision (ECCV), Jul. 20, 2020, 16 pages.

(56) References Cited

OTHER PUBLICATIONS

Rabinovich et al., Scalable Locally Injective Mappings, ACM Transactions on Graphics (TOG), vol. 36, No. 2, Apr. 2017, 16 pages.

Schreiner et al., Inter-surface Mapping, ACM Transactions on Graphics, vol. 23, No. 3, Aug. 2004, pp. 870-877.

Sheffer et al., Mesh Parameterization Methods and their Applications, Foundations and Trends® in Computer Graphics and Vision, vol. 2, No. 2, 2006, pp. 105-171.

Sinha et al., Deep Learning 3D Shape Surfaces Using Geometry Images, European Conference on Computer Vision, 2016, pp. 223-240.

Sitzmann et al., Implicit Neural Representations with Periodic Activation Functions, arXiv:2006.09661, Available Online at: https://arxiv.org/pdf/2006.09661.pdf, 2020, 35 pages.

Sorkine et al., As-Rigid-As-Possible Surface Modeling, SGP '07: Proceedings of the fifth Eurographics symposium on Geometry processing, vol. 4, Jul. 2007, pp. 109-116.

Fan et al., A Point Set Generation Network for 3D Object Reconstruction from a Single Image, IEEE Conference on Computer Vision and Pattern Recognition (CVPR), 2017, 12 pages.

Tutte, How to Draw a Graph, Proceedings of the London Mathematical Society, vol. 3, No. 1, May 22, 1962, pp. 743-767.

Vaswani et al., Attention is all You Need, 31st Conference on Neural Information Processing Systems, Available Online at: https://arxiv.org/pdf/1706.03762.pdf, Dec. 6, 2017, pp. 1-15.

Weber et al., Locally Injective Parametrization with Arbitrary Fixed Boundaries, ACM Transactions on Graphics (TOG), vol. 33, No. 4, Jul. 2014, pp. 1-12.

Williams et al., Deep Geometric Prior for Surface Reconstruction, In Proceedings of the IEEE Conference on Computer Vision and Pattern Recognition, 2019, pp. 10130-10139.

Yang et al., FoldingNet: Point Cloud Auto-encoder via Deep Grid Deformation, In Proceedings of the IEEE Conference on Computer Vision and Pattern Recognition, 2018, pp. 206-215.

* cited by examiner

NEURAL NETWORK BASED 3D OBJECT SURFACE MAPPING

TECHNICAL FIELD

The present disclosure generally relates to three-dimensional (3D) computer graphics. More specifically, but not by way of limitation, the present disclosure relates to techniques for efficiently rendering an updated graphical representation of an object based on the surface of another object.

BACKGROUND

Graphic design software applications are used for graphic illustration, multimedia development, specialized image development, and graphics editing. Such applications utilize either raster or vector graphic editing methods to create, edit, and view digital media (e.g. animations, graphics, images, designs, media objects, etc.). Maps are arguably one of the most fundamental ways to define and operate on surfaces depicted as part of digital media objects with such applications. Although certain existing solutions allow graphic designers to use maps for many core operations carried out with graphic design software, most computational representations of surface maps do not lend themselves to computationally efficient and accurate manipulation and optimization.

For example, consider a function of such software such as surface-to-surface mapping, which enables defining correspondences between surfaces. Such correspondences can in turn be used to perform, as examples, shape analysis, deformations, and the transfer of properties from one surface to another. The target surface for surface-to-surface mapping is typically a three-dimensional (3D) mesh. Such meshes are combinatorial representations, meaning that combinatorial representations of the maps must be used, resulting in a surface-to-surface mapping process that is computationally expensive, or produces only approximate depictions.

SUMMARY

Certain aspects and features of the present disclosure relate to neural network based 3D object surface mapping. For example, a computer-implemented method involves generating a surface mapping function for mapping a first surface of a first three-dimensional (3D) object in a 3D space to a second surface of a second 3D object in the 3D space. The surface mapping function is defined by a first representation of the first surface, a second representation of the second surface, and a neural network model configured to map a first two-dimensional (2D) representation to a second 2D representation. The first representation corresponds to a mapping from the first 2D representation of the first surface to the first surface of the first 3D object. The second representation corresponds to a mapping from the second 2D representation of the second surface to the second surface of the second 3D object. Generating the surface mapping function includes adjusting parameters of the neural network model to optimize an objective function. The objective function includes a distortion term defining distortion between the first surface and the second surface mapped through the surface mapping function. The method also involves applying a feature of a first 3D mesh on the first surface to a second 3D mesh on the second surface to produce a modified second surface. The first 3D mesh on the first surface maps to the second 3D mesh on the second surface are determined by the surface mapping function. The method can include rendering the modified second surface.

Other embodiments of this aspect include corresponding computer systems, apparatus, and computer programs recorded on one or more computer storage devices, each configured to perform the actions of the methods.

This summary is not intended to identify key or essential features of the claimed subject matter, nor is it intended to be used in isolation to determine the scope of the claimed subject matter. The subject matter should be understood by reference to appropriate portions of the entire specification of this disclosure, any or all drawings, and each claim.

BRIEF DESCRIPTION OF THE DRAWINGS

Features, embodiments, and advantages of the present disclosure are better understood when the following Detailed Description is read with reference to the accompanying drawings, where.

DETAILED DESCRIPTION

Figure 1:
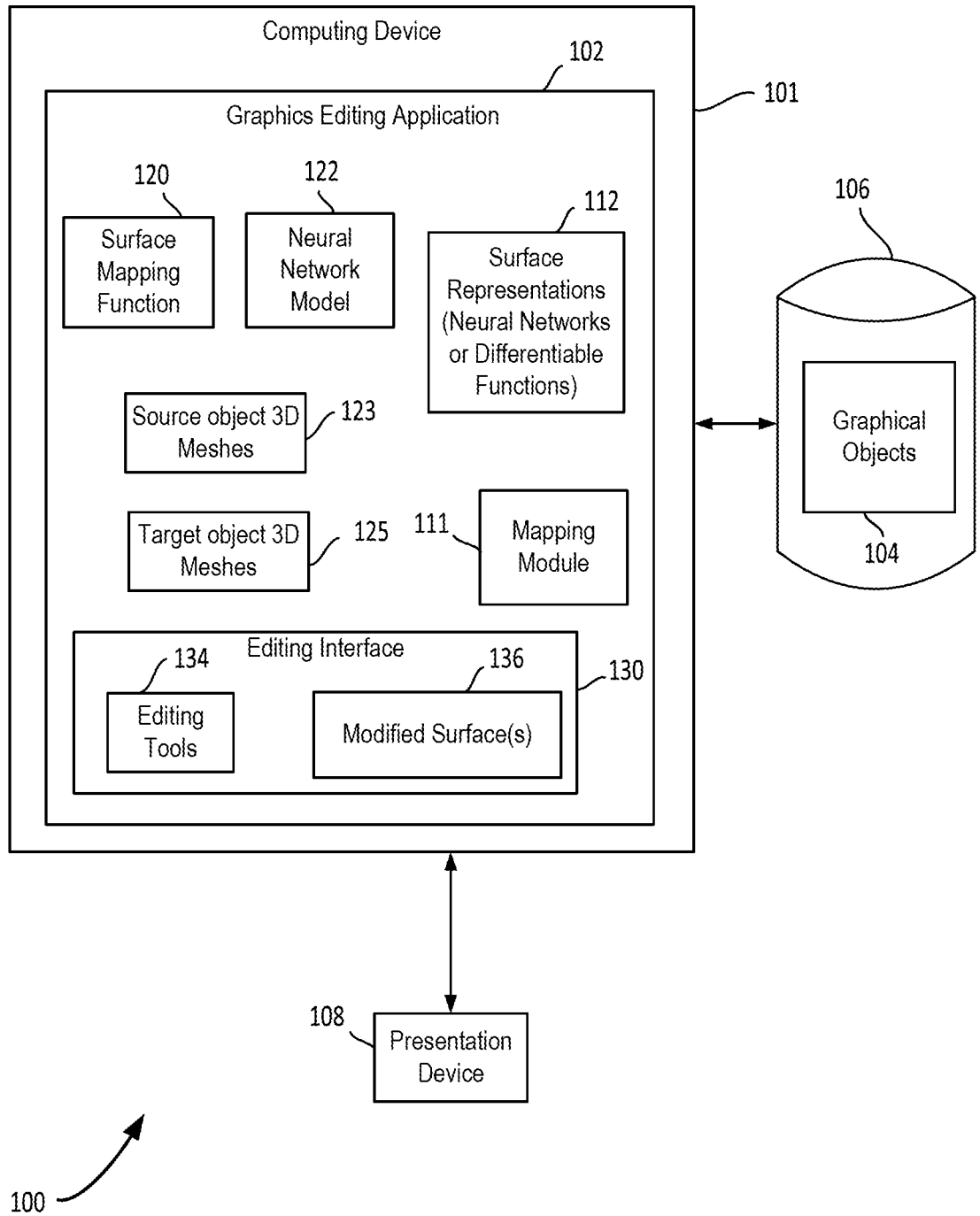
FIG. 1 is a diagram showing an example of a computing environment for neural network based 3D object surface mapping, according to certain embodiments.

As described above, surface-to-surface mapping features in existing applications, when used with 3D mesh target surfaces, can result in surface-to-surface mappings that are computationally expensive or exhibit reduced accuracy. As an example, consider the problem of a mesh-to-mesh mapping in which a continuous mapping from one surface to another is computed. The software needs to account for the image of each source vertex, which may land on a triangle of the target mesh, and the image of a source edge, which may span several triangles of the target mesh. If distortion is to be minimized, extensive bookkeeping must be carried out, using significant memory. Further, reducing the resulting distortion may require extensive combinatorial optimization of the choice of target triangle for each source vertex, which is computationally expensive.

Embodiments herein produce at least two representations of surfaces, where each surface is from a 3D object depicted using a 3D mesh. One or both of these representations may be a neural network representation. A surface mapping function is generated for mapping one of the surfaces, a source surface of a source 3D object, to a target surface of a target 3D object. The surface mapping function is defined by the representations, as well as by a neural network model configured to map the first representation to the second representation. Parameters of the neural network model are adjusted to optimize an objective function that includes a distortion term. The surface mapping function with the adjusted parameters can then be used to map features of the source 3D mesh to the target 3D mesh to produce a modified target surface.

Certain embodiments provide improvements over existing techniques for generating surface-to-surface mapping for 3D objects. In particular, neural networks are used to approximate the surface map. The use of neural networks eliminates the need of mappings between two 3D meshes, thereby reducing the computational complexity of the mapping algorithm. In addition, the neural networks are differentiable and composable with one another leading to a model for efficiently defining a differentiable composition of surface maps. As such, multiple maps (maps from 2D representation to 3D surface, one 2D representation to another 2D representation) can be composed and optimized for objectives defined over the composition. A surface mapping function can be generated and used in the surface-to-surface mapping, where the surface mapping function is defined by representations of the surfaces, as well as by a neural network model. One or both surface representations can be neural network representations. Alternatively, as an example, a target surface can be represented by a differentiable function. A neural network representation of a surface can optionally be trained using a neural network model, for example, the same neural network model that is used in generating the surface mapping function. A new surface resulting from a surface-to-surface mapping can be efficiently rendered and displayed on a display device.

The following non-limiting example is provided to introduce certain embodiments. In this example, a graphics editing application transfers surface features from a source 3D graphical object to a target 3D graphical object. The graphics editing application identifies the surface of the source 3D graphical object and highlights a surface of the target 3D graphical object. The graphic editing application further performs a surface-to-surface mapping of the identified surface of the source 3D graphical object to the selected surface of the target 3D graphical object. Either or both surfaces can be minimal or extensive, even covering all of the relevant 3D object.

Continuing with this example, the graphics editing application produces and stores surface representations in memory and generates the mapping function and the objective function with the distortion term. One or both of the surface representations can be neural network representations. A neural network representation can be produced using points in a 2D representation based a 3D mesh of an object. The mapping function is defined based on the surface representations and a neural network model. The neural network model can include an input layer including a first pair of nodes representing ordinates in one 2D representation and an output layer including a second pair of nodes representing coordinates in another 2D representation. The resulting mapping function is stored and referenced by the graphics editing application, which uses the mapping function to efficiently map the source surface to the target surface. The mapping function parameters are stored in memory and adjusted, with new values being successively stored until an objective function is optimized to provide the mapping. The resulting surface is stored and the graphics editing application efficiently renders and displays the resulting surface with minimal distortion.

By using neural networks as stored, parametric representations of surfaces, a graphical computing process can access stored models that rely on the differentiable algebra of a surface map. Distortion can be minimized without extensive combinatorial representations to handle triangular meshes. Thus, accurate renderings can be produced quickly with relatively modest computing resources. Mapping one surface onto another can provide a mechanism for efficiently and quickly editing the target surface, for example, by transferring textures or surface features onto the target surface.

Aspects and features herein can treat neural networks as parametric representations of surface maps and surfaces. Neural networks that receive 2D points as input and output points either in 2D or 3D can be used as representations. In some examples, a differentiable function can alternatively be used to represent a target surface.

FIG. 1 is a diagram showing an example of a computing environment for neural network based 3D object surface mapping, according to certain embodiments. The computing environment 100 includes a computing device 101 that executes a graphics editing application 102, a memory device 106 configured to store graphical objects 104, and a presentation device 108 that is controlled based on the graphics editing application 102. In this example, the graphics editing application 102 includes a mapping module 111. The mapping module 111 can produce representations 112 of surfaces of 3D objects in a 3D space. Graphics editing application 102 can use these representations as well as a surface mapping function 120 and a neural network model 122 to map a first 2D representation to a second 2D representation by applying one or more features of a source object to a source object 3D mesh 123 and/or applying one or more features of a target object to a target object 3D mesh 125. The graphics editing application 102 can generate the surface mapping function in part by adjusting neural network model parameters to optimize an objective function, subject to objective function constraints. The objective function includes one or more distortion terms defining distortion between the first surface and the second surface mapped through the surface mapping function 120.

The graphics editing application 102 also generates a graphics editing interface 130. In some embodiments, the graphics editing application 102 uses inputs related to editing tools 134 received via the graphics editing interface 130 to control one or more operations of the graphics editing application 102. The graphics editing application 102 provides the editing interface 130 for display at a presentation device 108, which can be a local presentation device or a computing device that is remotely accessible over a data network. The graphics editing application includes one or more software modules, for example, a rendering module (not shown) that render modified surfaces 136 for display in the editing interface 130.

Figure 2:
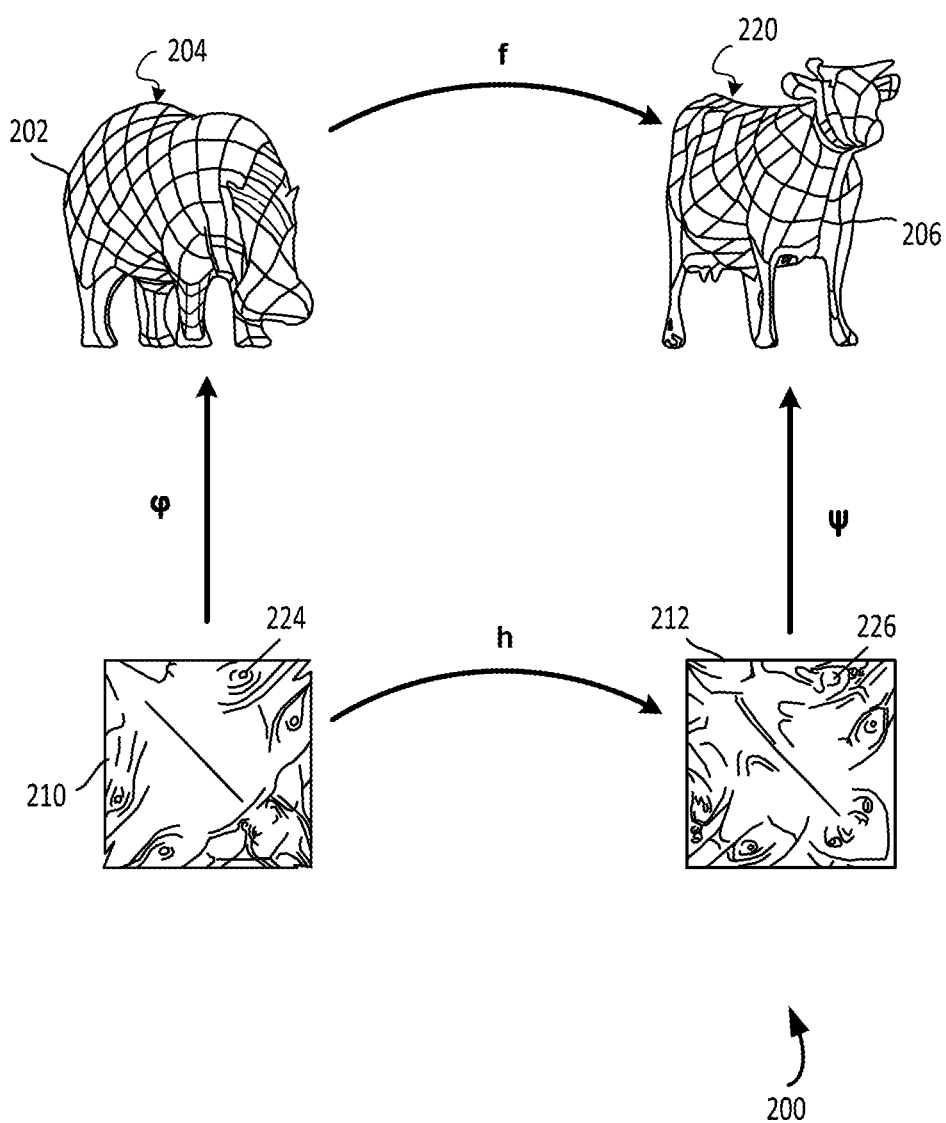
FIG. 2 is a schematic drawing of examples of surfaces and representations as used in an example of neural network based 3D object surface mapping, according to certain embodiments.

FIG. 2 is a schematic drawing of an example 200 of surfaces and representations as used in an example of neural network based 3D object surface mapping to show their relationships, according to certain embodiments. Example 200 includes a first 3D object 202, a hippopotamus, with a first surface 204, and a second 3D object 206, a cow, with a second surface 220. 2D representation 210 corresponds to first surface 204 and 2D representation 212 corresponds to the second surface 220. Aspects and features herein additionally employ neural network representations of the surfaces to take advantage of the properties of neural networks that make them differentiable and composable with one another. The differentiable-geometry definition of a surface as a map from 2D to 3D is used, by overfitting a 2D representation 210 to a given UV (2D) parameterization, computed via any bijective parameterization algorithm.

Neural network model h is configured to generate the 2D representation 212 of the surface 220 based on the 2D representation 210 of the surface 204. Given first surface representation (φ), the second surface representation (ψ), and the neural network model h, the mapping function $f$ can be derived to map one surface (surface 204) to another (surface 220), resulting in a modified second surface 220. Mapping function $f$ can be derived through distortion minimizing and may be subject to constraints, for example, constraints to match corresponding portions of the objects 202 and 206 such as feet 224 of the hippopotamus to feet 226 of the cow. Additional or alternative constraints may be provided, for example, for facial features of the animals. These objects, surfaces, and surface representations based on φ and ψ will be referenced as an example below in discussing the flowcharts of FIG. 3, FIG. 4, and FIG. 5.

Figure 3:
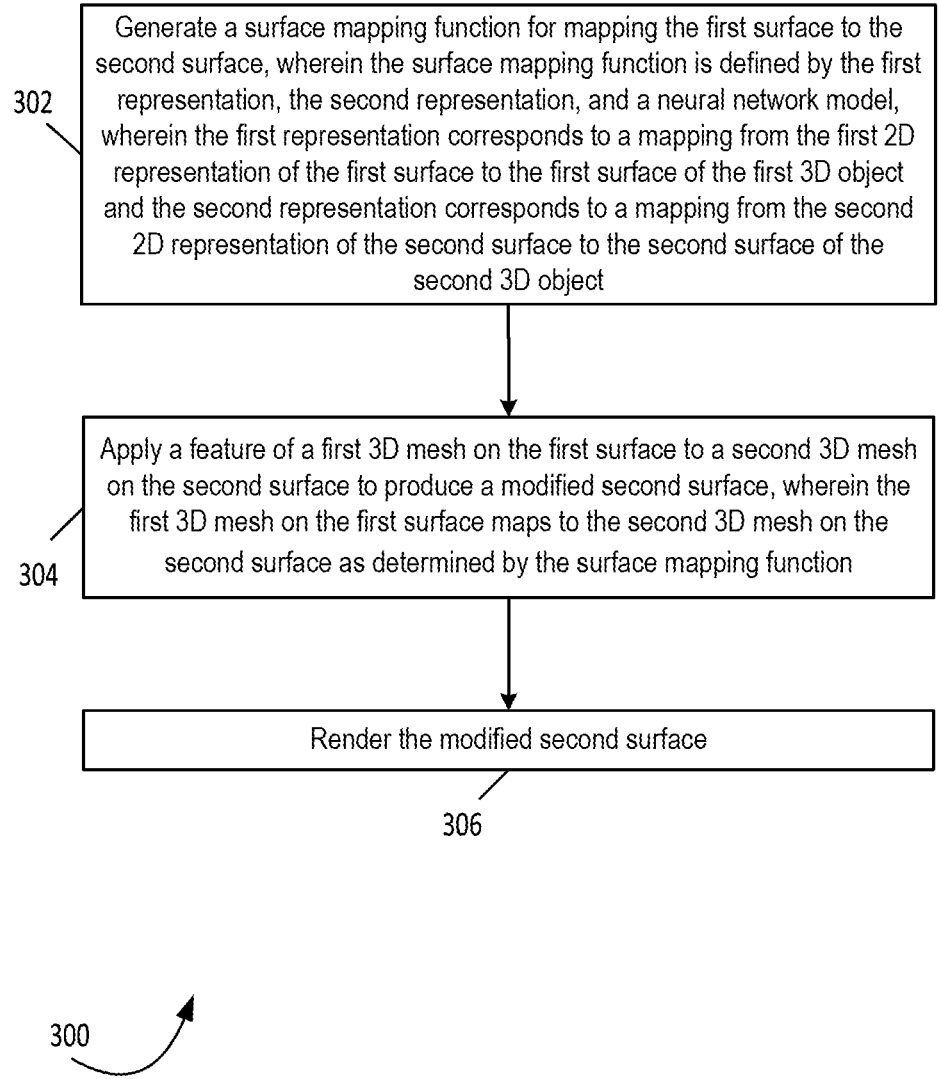
FIG. 3 is a flowchart of an example of a process for neural network based 3D object surface mapping, according to some embodiments.

FIG. 3 is a flowchart of an example of a process 300 for neural network based 3D object surface mapping, according to some embodiments. In this example, a computing device carries out the process by executing suitable program code, for example, computer program code for a graphics editing application, for example, graphics editing application 102. At block 302, the computing device generates a surface mapping function $f$ for mapping the first surface to the second surface. The computing device produces a first representation of a first surface of a first 3D object in a 3D space, for example, surface 204 of object 202, both of FIG. 2. The first representation corresponds to a mapping from a first 2D representation of the first surface to the first surface of the first 3D object. The first 2D representation, as examples, may within a unit square or a unit circle. In terms of the example of FIG. 2, first representation φ is configured to map a 2D representation 210 of the surface 204 of the object 202 to the surface 204. As an example, a first representation may be a neural network representation, for example, one represented by the function:

$$f: \mathbb{R}^2 \to \mathbb{R}^n$$

The second representation corresponds to a mapping from the second 2D representation of the second surface to the second surface of the second 3D object 206. In terms of the example of FIG. 2, the second representation ψ is configured to map the 2D representation 212 of the original surface 220 of object 206 to the surface 220. The representations can be stored in the computing device 101.

The surface mapping function is defined by the first representation φ, the second representation ψ, and a neural network model h configured to map the first 2D representation 210 to the second 2D representation 212, for example:

$$f \circ \varphi \triangleq \psi^h.$$

As referenced herein, a neural network representation, such as φ or ψ of a surface and the neural network model h are each neural networks. The neural network model is a neural network that serves as an intermediary between a neural network representation of a surface and a representation of another surface, which may be another neural network representation. A neural network representation represents a surface of a 3D object through overfitting. Generating the surface mapping function includes adjusting parameters of the neural network model to optimize an objective function. The objective function includes a distortion term defining distortion between the first surface and the second surface mapped through the surface mapping function.

At block 304 of process 300, the computing device applies one or more features of a first 3D mesh on the first surface to a second 3D mesh on the second surface to produce a modified second surface as determined by the surface mapping function. The 3D meshes may be stored in computing device 101, for example, as 3D meshes 123. In terms of the example of FIG. 2, surface 220 of object 206 has similar features, such as the color patterns, as surface 204 of object 202, and is a modified second surface. This modified second surface can be rendered at block 306 for display in editing interface 130 on presentation device 108.

Figure 4:
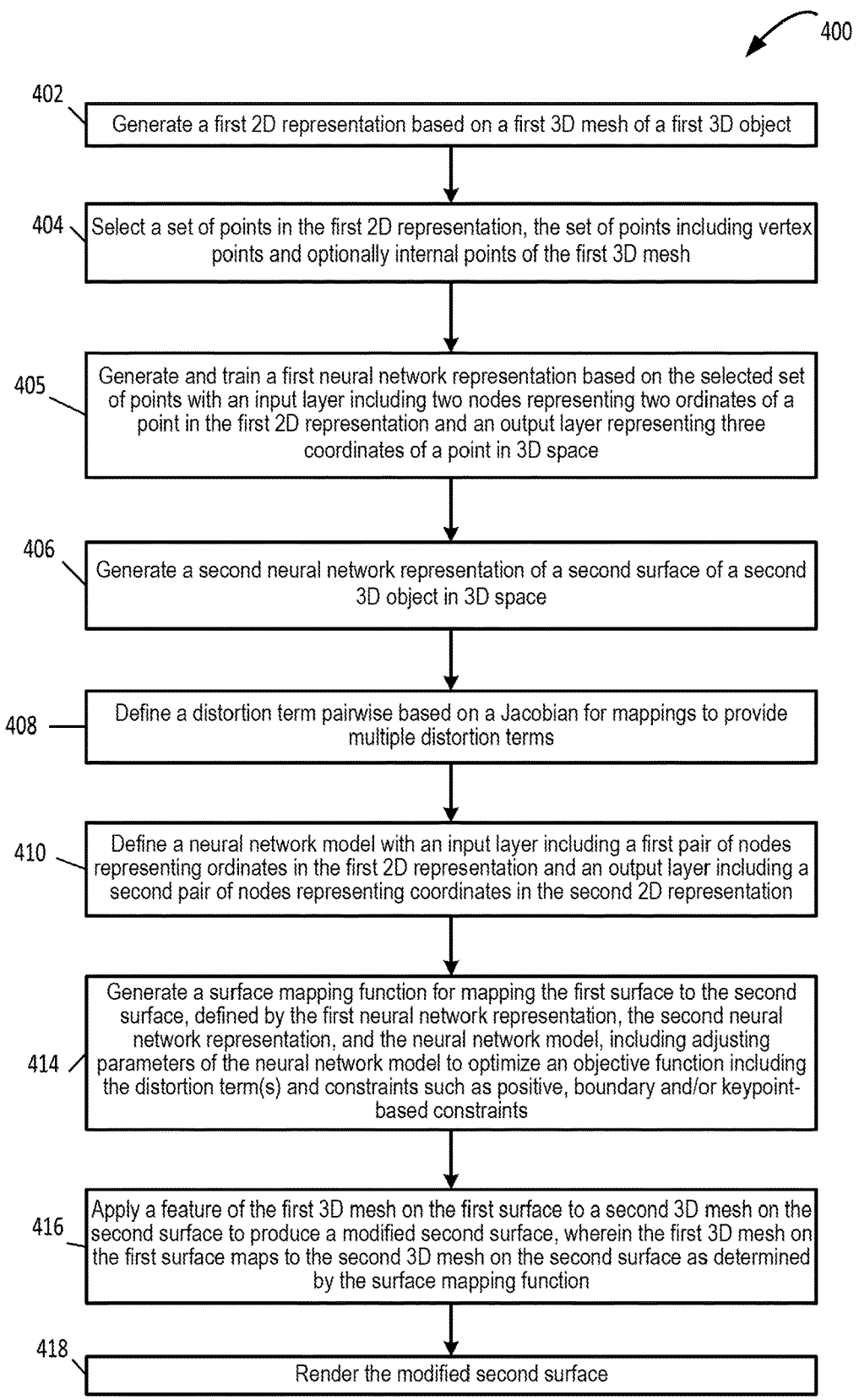
FIG. 4 is a flowchart of another example of a process for neural network based 3D object surface mapping, according to some embodiments.

FIG. 4 is a flowchart of another example of a process 400 for neural network based 3D object surface mapping, according to some embodiments. In process 400, both the first surface representation and the second surface representation are neural network representations. These representations may be stored in computing device 101, for example, as surface representations 112. In this example, a computing device carries out the process by executing suitable program code, for example, computer program code for a graphics editing application such as graphics editing application 102. The term neural surface map and similar terms used herein may to refer to any neural network considered as a function, for example:

$$\phi: \mathbb{R}^2 \to \mathbb{R}^n,$$

where the output dimension n is two or three. This ensures the map's image is always a 3D surface, and, assuming the map is non-singular, also a 2-manifold map. Neural surface maps can be seen as an alternative method to represent a surface map that provides the advantages of differentiability, and the ability to be composed with other neural maps. Neural surface maps enable compositions, for example, φ∘ψ, and define an objective over the composition o0 (φ∘ψ), which can be differentiated and optimized via standard deep-learning libraries and optimizers. The operator ∘ represents the composition of one map with the other, for example, taking the output of ψ and plugging in as the input of φ. ∘ (φ∘ψ) is the equivalent of φ(ψ). Any size of architecture and activation function can be used, and the universal approximation theorem will ensure that a given network is capable of approximating a given surface function.

At block 402 of process 400, the computing device generates a first 2D representation based on a first 3D mesh of a first 3D object. The 2D representation can be obtained by computing a parameterization of the 3D mesh into 2D using scalable, locally injective mappings, providing a one-to-one map from 2D to 3D. Its inverse is treated as a ground truth representation of the 3D surface (a map of 2D points to 3D). A neural network is then overfit to that (inverse) map and treated as the neural representation of the surface, which can then be composed with other neural maps. At block 404, the computing device selects a set of points in the first 2D representation. The set of points includes points corresponding to the vertex points in the first 3D mesh. In some examples, the set of points can also include points corresponding to internal points (points falling inside the triangles or polygons) of the first 3D mesh. At block 405, the computing device generates a first neural network representation based on the selected set of points with an input layer including two nodes representing two ordinates of a point in the first 2D representation and an output layer representing three coordinates of a point in 3D space. The neural network is trained. As an example, representation of FIG. 2 can be a first neural network representation of surface 204 of object 202. The neural network representation is trained by adjusting parameters to minimize a loss function. The loss function is defined based on Euclidean distances between output points of the neural network model using the previously defined set of points as input, and ground truth points of the set of points in 3D space. At block 406, the computing device generates a second neural network representation of a second surface of a second 3D object in 3D space in a similar manner. An advantage of this representation's composability is that it enables representing maps between a pair of surfaces, using a common domain. Two overfitted neural maps, $\Omega \to \mathbb{R}^3$ can respectively represent two surfaces $\mathcal{S}$, $\mathcal{T}$ so that the maps can be used to define and optimize a mapping between two 3D surfaces $f: \mathcal{T} \to \mathcal{S}$. Representing the 3D surfaces using neural network models allows the representations to be associated more closely.

At block 408 of process 400, the computing device defines a distortion term, based on pairwise comparison of the surfaces. The distortion term is based on a Jacobian of $f$ for mappings to provide multiple distortion terms. The Jacobian of $f$ can be derived from the Jacobian of $\psi$ and the inverted Jacobian of $\varphi$. At block 410, the neural network model is defined. The neural network model includes an input layer with a first pair of nodes representing ordinates in the first 2D representation and an output layer with at least a second pair of nodes representing ordinates in the second 2D representation Still referring to FIG. 4, at block 414 of process 400, the computing device generates a surface mapping function $f$ for mapping the first surface to the second surface. The surface mapping function is defined by the first neural network representation, the second neural network representation, and the neural network model configured to map the first 2D representation to the second 2D representation. Generating the surface mapping function can include adjusting parameters of the neural network model to optimize an objective function. The objective function includes a distortion term defining distortion between the first surface and the second surface mapped through the surface mapping function as previously described. In this example, the parameters are adjusted within constraints, as examples, positive, boundary, and/or keypoint-based constraints. These constraints may be stored and retrieved by computing device 101. The mapping function $f$ can be defined such that for any point $p \in \Omega$, $f$ is implicitly defined the map satisfying $f \circ \varphi \triangleq \psi^h$, with $\varphi$ and $\psi$ shown in FIG. 2, or for any point $p \in \Omega$, $f$ matches the image of $p$ under $\varphi^h$ with the image of $p$ mapped through $h$ and then through $\psi$ in FIG. 2. $\Omega$ is the 2D domain that is mapped to the entire surface. The 2D unit circle is used in the examples described herein. The functions included in block 408 through block 414 and discussed with respect to FIG. 4 can be used in implementing a step for generating a surface mapping function for mapping the first surface to the second surface, wherein the surface mapping function is defined by the first representation, the second representation, and a neural network model configured to map the first 2D representation to the second 2D representation.

The representation of 3D geometries is, in this example, via an overfitted neural surface map $\phi: \Omega \to \mathbb{R}^3$ that approximates a given map $f$. $\phi$ can be treated as a de-facto representation of the geometry. Optimization of the map with traditional techniques may be non-trivial since it will immediately change the 3D geometry. To overcome this, an intermediate neural network, neural network model h: $\Omega \to \Omega$ is produced to define a new map, $\phi^h = \phi \circ h$. As long as the process 400 solely optimizes $h$ and insures $h$ maps onto $\Omega$, the image of $\phi^h$ will correspond to the image of $\phi$, i.e., will respect the original surface. The distortion of $\phi^h$ can be optimized by optimizing $h$ and keeping $\phi$ fixed, thereby finding a map from $\Omega$ to $\mathcal{S}$, which is at least a local minimizer of the distortion. The distortion in this example can be measured by:

$$\min_h D(\phi^h).$$

The distortion is a differentiable property of the map, and hence is readily available, e.g., via automatic differentiation.

Returning to FIG. 4, at block 416 of process 400, the computing device applies one or more features of a first 3D mesh on the first surface to a second 3D mesh on the second surface to produce a modified second surface. This modified second surface can be rendered at block 418 for display in editing interface 130 on presentation device 108.

For overfitting the neural surface maps, $\Omega = [-1,1]^2 \subset \mathbb{R}^2$ is a unit circle. In this example, the neural maps make use of Q as a canonical domain. Given any map $f: \Omega \to \mathbb{R}^n$, the map can be approximated via neural surface map $\phi$ by using black-box methods to train the neural network and overfit it to replicate $f$. The least-square deviation of $\phi$ from $f$ and the surface normal deviation can be approximated by minimizing the integrated error:

$$\mathcal{L}_{overfit} = \int_{p \in \Omega} \|f(p) - \phi(p)\|^2 + \lambda_n \int_{p \in \Omega} \|n_{\phi p} - n_{fp}\|^2, \quad (1)$$

where $n_{\phi p}$ is the estimated normal at p, and $n_{fp}$ is the ground truth normal. In case $f$ describes a continuous map, for example a piecewise-linear map for mapping triangles to triangles, the objective function can be optimized by approximating the integral in Monte-Carlo fashion, for example, by summing the integrand at random sample points. To use neural surface maps to represent surfaces, the ground truth map $f$ is computed to overfit to a UV parameterization of the mesh into 2D, computed via any bijective parameterization algorithm. Examples include Tutte's embedding, and scalable, locally injected mappings, by which an injective map of the mesh onto $\Omega \subset \mathbb{R}^2$ can be achieved. Treating the inverse of this map, which maps back into the 3D mesh $\mathcal{S}$, as the input $f: \Omega \to \mathcal{S}$, and overfitting $\phi$ to it by minimizing Equation 1, a neural network representation of the surface can be obtained. More specifically, a mapping into the surface is obtained, where the mapping is endowed with specific UV coordinates, with point $\phi(x,y)$ having UV coordinates x,y.

In order to optimize several energies related to the neural surface maps, for a neural network map $\phi: \Omega \to \mathbb{R}^n$, the Jacobian of $\phi$ can be denoted by $J_p \phi \in \mathbb{R}^{n \times 2}$, the matrix of partial derivatives at point $p \in \Omega$. The Jacobian quantifies the local deformation at a point. For isometric distortion, letting $M_p = J_p^T J_p$, the symmetric Dirichlet energy can be quantified as, $$D_{iso} = \int_\Omega \text{trace}(M_p) + \text{trace}((M_p + \epsilon I)^{-1}) \quad (2)$$

where I is the identity matrix, added with a small constant ($\frac{1}{100}$) to regularize the inverse. Likewise, a measure of conformal distortion can be defined via, $$D_{conf} = \int_\Omega \left\| \frac{\text{trace}(M_p)}{\|M_p\|^2} M_p - I \right\|^2. \quad (3)$$

The integrals can be accounted for by random sampling of the function in the domain.

Even though $f$ itself is not tangible for optimization, as it is implicitly defined by the neural network model h, the differential quantity from $f$ used in this example to compute the distortion is the Jacobian of $f$ denoted $J_q f$ at point $q=\phi p$. Using differential calculus, $J_q f$ can be derived to be:

$$J_q f = J_p \psi^h (J_p \phi)^{-1}, \quad (4)$$

which is composed of the Jacobian of $\psi$ and the inverted Jacobian of $\phi$ at point p, both readily determinable. Hence, to optimize the distortion of $f$, Equation 4 can be used as the Jacobian to define M, which can be denoted as $D(f)$.

In order for h to well-define a surface map, it needs to map bijectively (1-to-1, and onto) the source domain of $\phi$, which is $\Omega$. This can be assured by ensuring that h has a positive-determinant Jacobian everywhere, and maps to the target surface boundary injectively. h can be optimized to map the boundary onto itself, via the energy, $$B(h) = \lambda_B \int_{\partial \Omega} \sigma(h(p)). \quad (5)$$

where $\sigma$ is the squared signed distance function to the boundary of $\Omega$. Note that the boundary map is free to slide along the boundary of $\Omega$ during optimization, enabling the boundary map to change. This is true for all points on the boundary except those mapped to the four corners, which are fixed in place and serve as keypoint constraints between the map models. h is also optimized to encourage its Jacobians determinant to be positive, via, $$G = \lambda_{inv} \int \max(-\text{sign}(|J_h|) \exp(-|J_h|), 0). \quad (6)$$

Optimization can be subject to keypoint constraints. When corresponding keypoints on the two surfaces are known, it may be desirable to require that the mapping function $f$ maps those points to one another. For example, the feet 224 of the hippopotamus and the feet 226 of the cow in FIG. 2 may be treated as keypoints subject to keypoint constraints. Given keypoints on $S$, in a preprocess before optimization, the system can access or determine their pre-images in $\Omega$, to obtain a set of points P s.t. $\phi(P_i)$ that maps to the i-th keypoint. Likewise, pre-images of the keypoints from $T$ and their pre-images Q under $\psi$ cam be obtained. If mapping these keypoints to one another between the two surfaces is required by $f$, requiring $h(P_i)=Q_i$ can guarantee that the induced function $f$ associates the points correctly. This equality can be optimized by reducing its least-squares error:

$$C(h) = \lambda_C \sum_i \|h(P_i) - Q_i\|_2^2. \quad (7)$$

To compute the surface-to-surface map, distortion of $f$ can be optimized with regard to h, while ensuring that h respects the mapping constraints, as given by:

$$\min_h D(f) + C(h) + B(h) + G(h). \quad (8)$$

The above yields a model h that maps onto the unit circle, and represents a distortion-minimizing surface mapping function f that maps the given sets of corresponding keypoints correctly.

Figure 5:
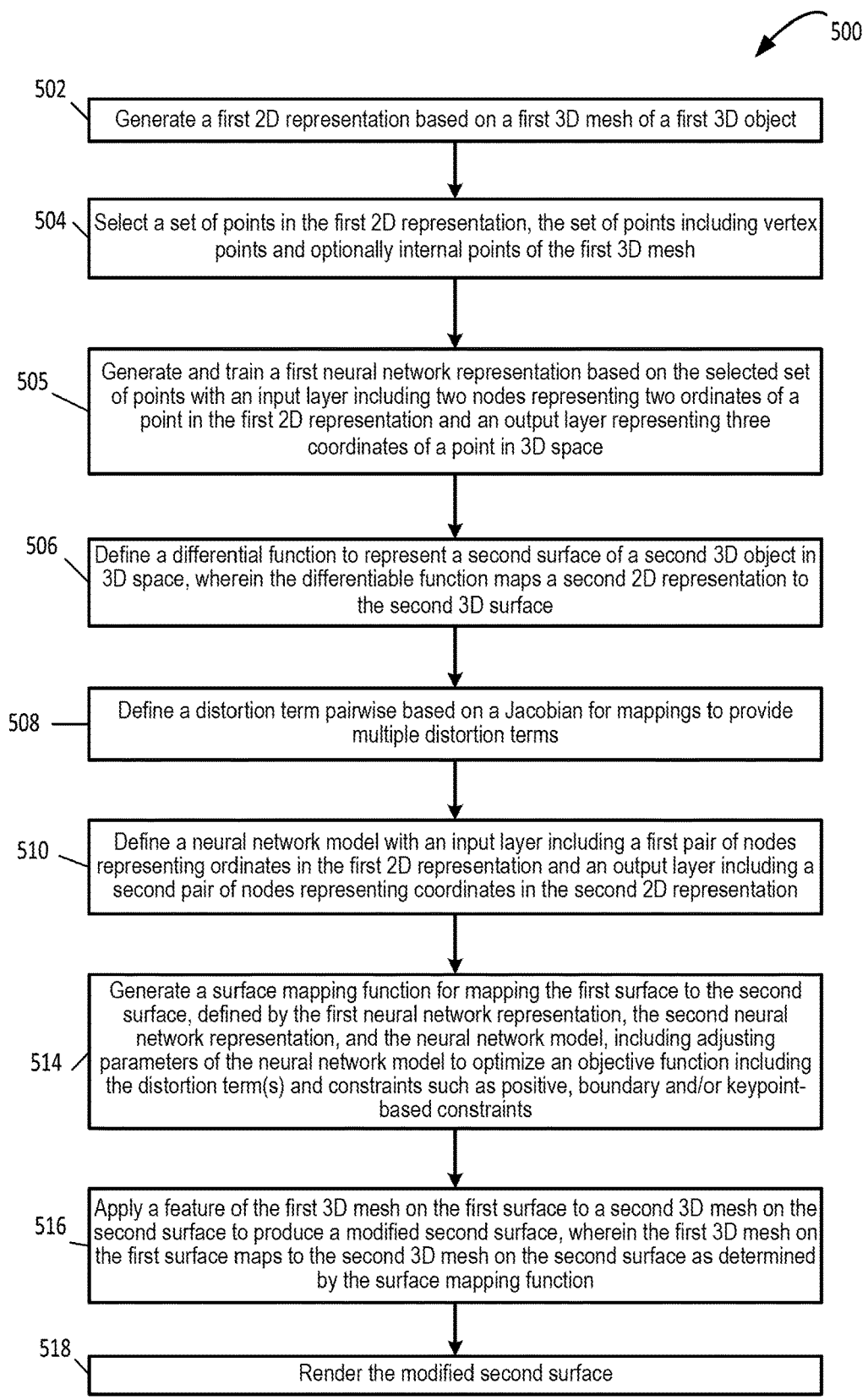
FIG. 5 is a flowchart of an additional example of a process for neural network based 3D object surface mapping, according to some embodiments.

FIG. 5 is a flowchart of an additional example of a process 500 for neural network based 3D object surface mapping, according to some embodiments. In process 500, the second surface representation is a differentiable function that maps the second 2D representation to the second 3D surface. The representations may be stored in computing device 101, for example, as surface representations 112. In this example, a computing device carries out the process by executing suitable program code, for example, computer program code for a graphics editing application, for example, graphics editing application 102.

At block 502 of process 500, the computing device generates a first 2D representation based on a first 3D mesh of a first 3D object. The representation can be obtained as previously described. At block 504, the computing device selects a set of points in the first 2D representation. The set of points includes points corresponding to the vertex points in the first 3D mesh. In some examples, the set of points can also include points corresponding to internal points (points falling inside the triangles or polygons) of the first 3D mesh. At block 505, the computing device generates a first neural network representation based on the selected set of points with an input layer including two nodes representing two ordinates of a point in the first 2D representation and an output layer representing three coordinates of a point in 3D space. The neural network is trained. At block 506, the computing device defines a differential function to represent a second surface of a second 3D object in 3D space, wherein the differentiable function maps a second 2D representation to the second 3D surface.

At block 508 of process 500, the computing device defines a distortion term. The distortion term is based on a Jacobian for mappings to provide multiple distortion terms as previously described. At block 510, the neural network model is defined. The neural network model includes an input layer with a first pair of nodes representing ordinates in the first 2D representation and an output layer with at least a second pair of nodes representing call ordinates in the second 2D representation.

Still referring to FIG. 5, at block 514 of process 500, the computing device generates a surface mapping function $f$ for mapping the first surface to the second surface. The surface mapping function is defined by the neural network representation, the differentiable function, and the neural network model configured to map the first 2D representation to the second 2D representation. Generating the surface mapping function can include adjusting parameters of the neural network model to optimize an objective function. The objective function includes the distortion term defining distortion between the first surface and the second surface mapped through the surface mapping function as previously described. In this example, the parameters are adjusted within constraints as previously described. The functions included in block 508 through block 514 and discussed with respect to FIG. 5 can be used in implementing a step for generating a surface mapping function for mapping the first surface to the second surface, wherein the surface mapping function is defined by the first representation, the second representation, and a neural network model configured to map the first 2D representation to the second 2D representation.

At block 516 of process 500, the computing device applies one or more features of a first 3D mesh on the first surface to a second 3D mesh on the second surface to produce a modified second surface as previously described. This modified second surface can be rendered at block 518 for display in editing interface 130 on presentation device 108.

Either the process of FIG. 4 or the process of FIG. 5 can be extended to k surfaces $S_1, S_2, \ldots, S_k$ represented respectively via neural network maps $\phi_1, \phi_2, \ldots, \phi_k$. For example, in order to extend process 400 of FIG. 4, a cycle-consistent set of surface maps can be produced by considering k additional neural network maps, $h_i: \Omega \to \Omega$, defining the composition $\phi_i^h = \phi_i \circ h_i$, and then defining the surface-to-surface maps $F_{i \to j}: S_i \to S_j$ via $F_{i \to j} \circ \phi_i^h \triangleq \phi_j^h$. This definition facilitates extraction of a set of mutually consistent maps while additionally optimizing for all pairs of surface-to-surface maps. Achieving similar qualities via traditional processes is significantly challenging, and makes it difficult to optimize for distortion minimization over the entire collection of surfaces without using significant computing resources.

Figure 6:
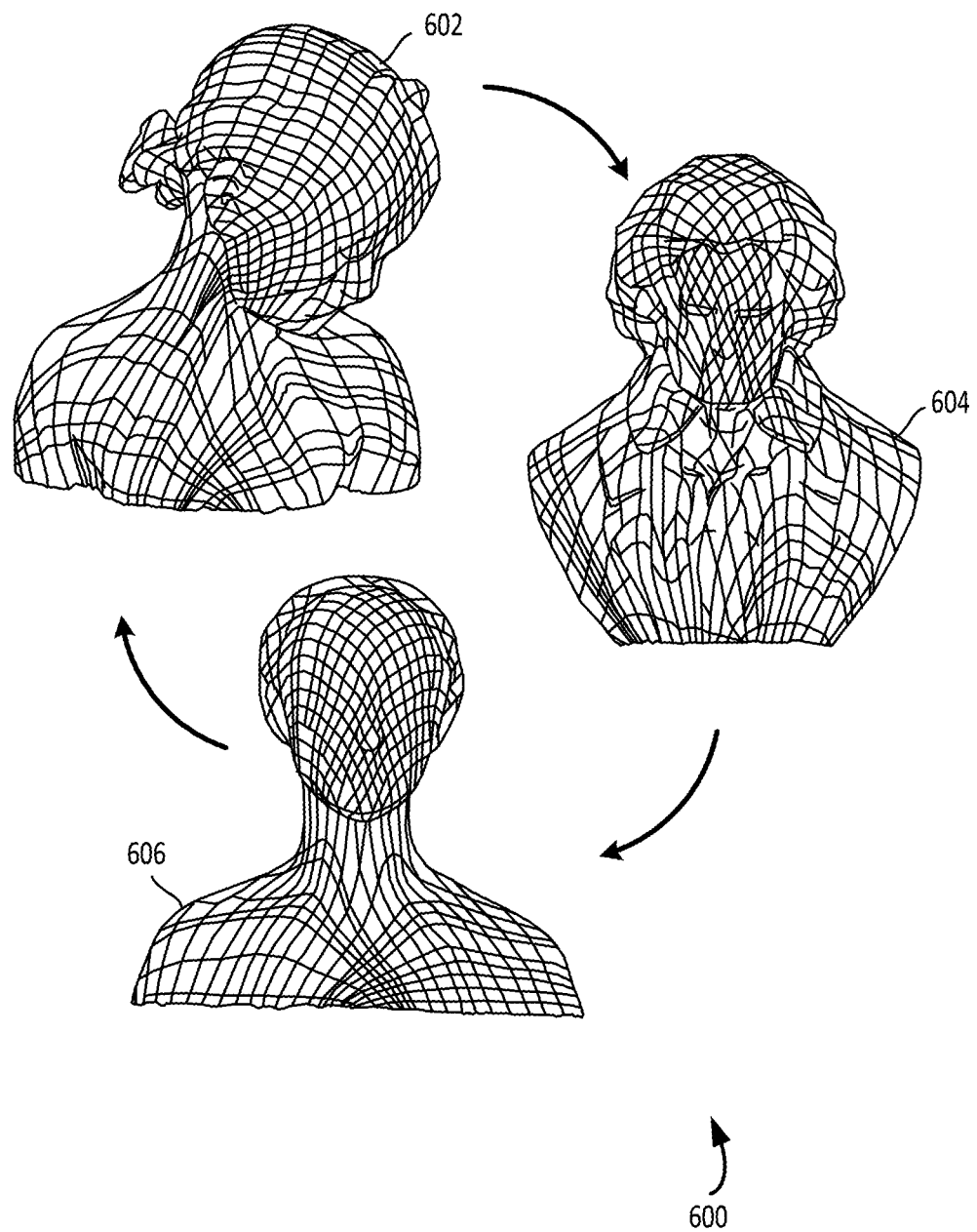
FIG. 6 is a schematic drawing of examples of surfaces as used in an example of neural network based 3D object surface mapping, according to certain embodiments.

FIG. 6 is a schematic drawing of an example 600 of surfaces as used in an example of neural network based 3D object surface mapping with a cycle-consistent set of surface maps. The surface mapping function maps a first surface in a collection of surfaces, for example, the surface of object 602 to a second surface in the collection of surfaces, for example, the surfaces of object 604. Similarly, another mapping function maps the second surface to a third surface in the collection, such as the surface of object 606. A third mapping function maps the third surface to the first surface in the collection. In this example, the distortion term can be defined pairwise for each of the mappings to provide multiple distortion terms and the distortion terms are added for optimization. Mapping takes place from one object to another using the neural network model. Cycle consistency is assured by construction.

Figure 7:
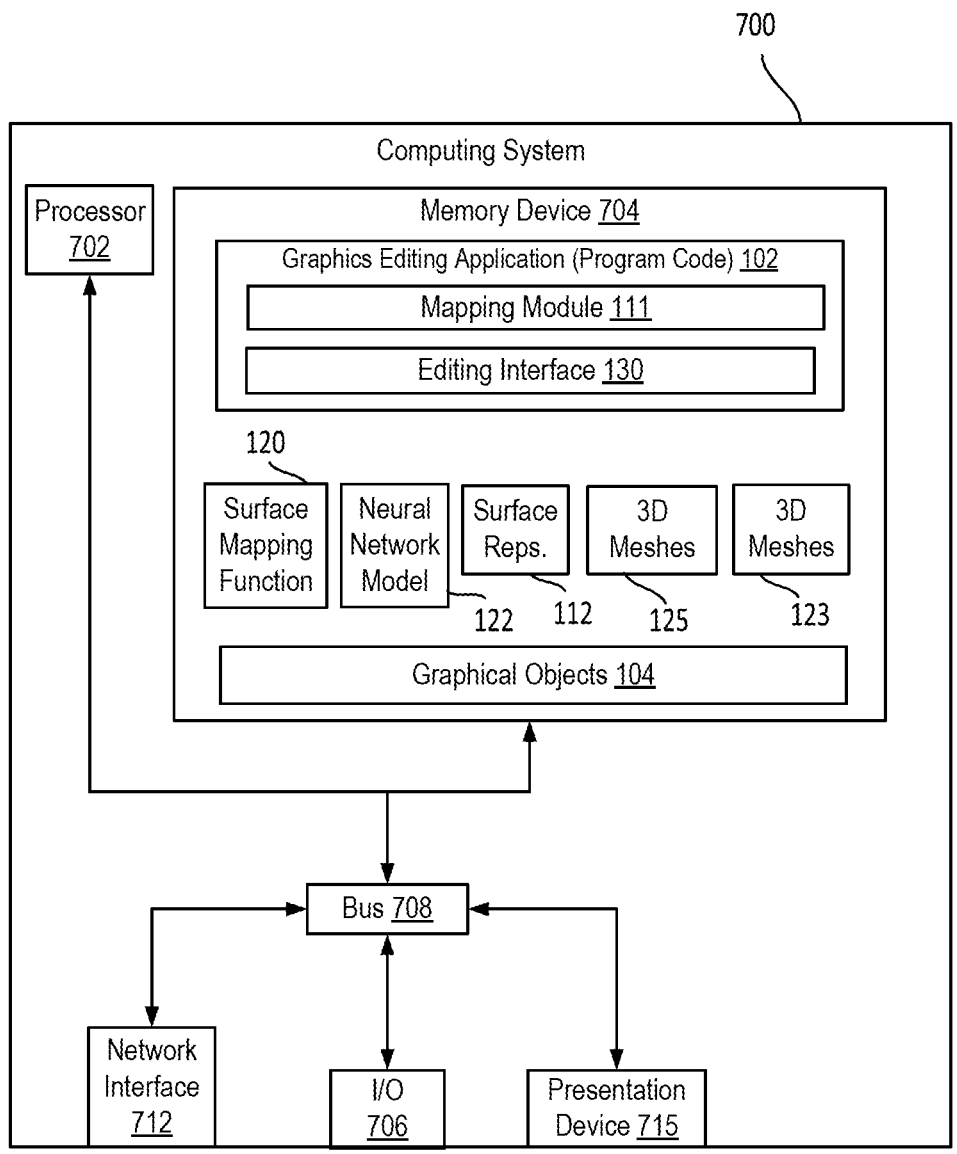
FIG. 7 is a diagram of an example of a computing system that can implement aspects of the neural network based 3D object surface mapping, according to certain embodiments.

FIG. 7 depicts a computing system 700 that executes the graphics editing application 102 with the capability of carrying neural network based 3D object surface mapping according to embodiments described herein. System 700 includes a processor 702 communicatively coupled to one or more memory devices 704. The processor 702 executes computer-executable program code stored in the memory device 704. Examples of the processor 702 include a microprocessor, an application-specific integrated circuit ("ASIC"), a field-programmable gate array ("FPGA"), or any other suitable processing device. The processor 702 can include any number of processing devices, including a single processing device. The memory device 704 includes any suitable non-transitory computer-readable medium for storing data, program code, or both. A computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, JavaScript, and ActionScript.

Still referring to FIG. 7, the computing system 700 may also include a number of external or internal devices, for example, input or output devices. For example, the computing system 700 is shown with one or more input/output ("I/O") interfaces 706. An I/O interface 706 can receive input from input devices or provide output to output devices (not shown). One or more buses 708 are also included in the computing system 700. The bus 708 communicatively couples one or more components of a respective one of the computing system 700. The processor 702 executes program code that configures the computing system 700 to perform one or more of the operations described herein. The program code includes, for example, graphics editing application 102, or other suitable applications that perform one or more operations described herein. The program code may be resident in the memory device 704 or any suitable computer-readable medium and may be executed by the processor 702 or any other suitable processor. Memory device 704, during operation of the computing system, executable portions of the graphics editing application, for example, mapping module 111, and editing interface 130 can access portions as needed. Memory device 704 is also used to temporarily store a surface mapping function 120, a neural network model 122, surface representations 112, 3D meshes 123, and 3D meshes 125, as well as other information or data structures, shown or not shown in FIG. 7, as needed. Memory device 704 also stores graphical objects 104 or portions thereof for the specific graphics editing job in progress. A graphical object in some examples is a data structure enabling representation and rendering of a 3D object, for example, object 202 and/or object 206 of FIG. 2.

The system 700 of FIG. 7 also includes a network interface device 712. The network interface device 712 includes any device or group of devices suitable for establishing a wired or wireless data connection to one or more data networks. Non-limiting examples of the network interface device 712 include an Ethernet network adapter, a wireless network adapter, and/or the like. The system 700 is able to communicate with one or more other computing devices (e.g., another computing device executing other software, not shown) via a data network (not shown) using the network interface device 712. Network interface device 712 can also be used to communicate with network or cloud storage used as a repository for stored media clips for use with the media editing application 102. Such network or cloud storage can also include updated or archived versions of the media editing application for distribution and installation.

Staying with FIG. 7, in some embodiments, the computing system 700 also includes the presentation device 715 depicted in FIG. 7. A presentation device 715 can include any device or group of devices suitable for providing visual, auditory, or other suitable sensory output. In examples, presentation device 715 displays graphical objects and surfaces. Non-limiting examples of the presentation device 715 include a touchscreen, a monitor, a separate mobile computing device, etc. In some aspects, the presentation device 715 can include a remote client-computing device that communicates with the computing system 700 using one or more data networks. System 700 may be implemented as a unitary computing device, for example, a notebook or mobile computer. Alternatively, as an example, the various devices included in system 700 may be distributed and interconnected by interfaces or a network, with a central or main computing device including one or more processors.

In addition to the surface-to-surface mapping described herein, neural network representations of surfaces and mappings can be used in various other mapping scenarios. Neural network representations as described herein can capture even very detailed features of the original shape with high fidelity. Neural network mapping as described herein can also be used for, as examples, surface parameterization, composition with analytical maps, cycle-consistent mapping for collections of surfaces, and baseline comparisons.

In an example implementation, neural network representations and/or neural network models as described herein include ten-layer, residual, fully connected networks, with 256 units per layer. Initial meshes can be uniformly sampled with 500,000 points. Since the networks are fully optimized, they can be trained until the gradient's normal drops below a threshold of 0.1. Optimization can be initialized with a learning rate of $10^{-4}$ and a momentum of 0.9 and a step size modulated with stochastic gradient descent with warm restarts. Surface maps can include four-layer, fully connected networks of 128 hidden units.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general purpose computing apparatus to a specialized computing apparatus implementing one or more implementations of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "configured to" herein is meant as open and inclusive language that does not foreclose devices adapted to or configured to perform additional tasks or steps. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art.

What is claimed is:

1. A computer-implemented method comprising:
    generating a surface mapping function for mapping a first surface of a first three-dimensional (3D) object in a 3D space to a second surface of a second 3D object in the 3D space, wherein the surface mapping function is defined by a first representation of the first surface, a second representation of the second surface, and a neural network model configured as an intermediary between the first representation and the second representation to map a first two-dimensional (2D) representation to a second 2D representation;
    selecting a set of points in the first 2D representation, the set of points comprising vertex points and internal points of a first 3D mesh, wherein:
        the first representation of the first surface is produced by minimizing a loss function defined based on Euclidean distances between (a) output points of the neural network model using the set of points as input and (b) ground-truth points of the set of points in the 3D space, so that the first representation of the first surface corresponds to a mapping from the first 2D representation of the first surface to the first surface of the first 3D object;
        the second representation corresponds to a mapping from the second 2D representation of the second surface to the second surface of the second 3D object; and
        generating the surface mapping function comprises adjusting parameters of the neural network model to optimize an objective function, wherein the objective function comprises a distortion term defining distortion between the first surface and the second surface mapped through the surface mapping function;
    applying a feature of the first 3D mesh on the first surface to a second 3D mesh on the second surface to produce a modified second surface, wherein the first 3D mesh on the first surface maps to the second 3D mesh on the second surface as determined by the surface mapping function; and
    rendering, by a rendering module, the modified second surface.

2. The computer-implemented method of claim 1, wherein the first representation of the first surface comprises a first neural network representation and the second representation of the second surface comprises a second neural network representation.

3. The computer-implemented method of claim 2, wherein producing the first neural network representation comprises:
    generating the first 2D representation based on the first 3D mesh of the first 3D object; and
    training the first neural network representation by adjusting the parameters of the first neural network representation to minimize the loss function;
    wherein the first neural network representation has an input layer with two nodes representing two ordinates of a point in the first 2D representation and an output layer with three nodes representing three ordinates of a point in the 3D space.

4. The computer-implemented method of claim 1, wherein the first representation of the first surface comprises a neural network representation and the second representation of the second surface comprises a differentiable function that maps the second 2D representation to the second surface.

5. The computer-implemented method of claim 1, wherein the neural network model comprises an input layer including a first pair of nodes representing ordinates in the first 2D representation and an output layer including a second pair of nodes representing coordinates in the second 2D representation.

6. The computer-implemented method of claim 1, wherein the distortion term is defined based on a Jacobian quantifying at least one of local deformation or conformal distortion.

7. The computer-implemented method of claim 1, wherein the objective function further comprises at least one of:
 a positive constraint;
 a boundary constraint for mapping a first boundary of the first 2D representation to a second boundary of the second 2D representation; or
 a keypoint-based constraint.

8. The computer-implemented method of claim 1, wherein the surface mapping function maps at least the first surface to each of a collection of surfaces, the method further comprising:
 defining the distortion term pairwise for each of a plurality of mappings to provide a plurality of distortion terms; and
 adding the plurality of distortion terms for optimization.

9. A system comprising:
 a processor; and
 a memory device configured to store a first representation of a first surface, a second representation of a second surface, and a modified second surface, the memory device further storing a graphics editing application executable by the processor for performing operations comprising:
  generating a surface mapping function for mapping a first surface of a first three-dimensional (3D) object in a 3D space to a second surface of a second 3D object in the 3D space, wherein the surface mapping function is defined by the first representation of the first surface, the second representation of the second surface, and a neural network model configured as an intermediary between the first representation and the second representation to map a first two-dimensional (2D) representation to a second 2D representation;
  selecting a set of points in the first 2D representation, the set of points comprising vertex points and internal points of a first 3D mesh, wherein:
   the first representation of the first surface is produced by minimizing a loss function defined based on Euclidean distances between (a) output points of the neural network model using the set of points as input and (b) ground-truth points of the set of points in the 3D space, so that the first representation of the first surface corresponds to a mapping from the first 2D representation of the first surface to the first surface of the first 3D object;
   the second representation corresponds to a mapping from the second 2D representation of the second surface to the second surface of the second 3D object; and
   generating the surface mapping function includes using an objective function comprising a distortion term defining distortion between the first surface and the second surface mapped through the surface mapping function;
  applying a feature of the first 3D mesh on the first surface to a second 3D mesh on the second surface to produce the modified second surface, wherein the first 3D mesh on the first surface maps to the second 3D mesh on the second surface as determined by the surface mapping function; and
  rendering the modified second surface.

10. The system of claim 9, wherein the first representation of the first surface comprises a first neural network representation and the second representation of the second surface comprises a second neural network representation.

11. The system of claim 10, wherein the operation of producing the first neural network representation comprises:
 generating the first 2D representation based on the first 3D mesh of the first 3D object; and
 training the first neural network representation by adjusting the parameters of the first neural network representation to minimize the loss function;
 wherein the first neural network representation has an input layer with two nodes representing two ordinates of a point in the first 2D representation and an output layer with three nodes representing three ordinates of a point in the 3D space.

12. The system of claim 9, wherein the first representation of the first surface comprises a neural network representation and the second representation of the second surface comprises a differentiable function that maps the second 2D representation to the second surface.

13. The system of claim 9, wherein the neural network model comprises an input layer including a first pair of nodes representing ordinates in the first 2D representation and an output layer including a second pair of nodes representing coordinates in the second 2D representation.

14. The system of claim 9, wherein the distortion term is defined based on a Jacobian quantifying at least one of local deformation or conformal distortion.

15. The system of claim 9, wherein the objective function further comprises at least one of:
 a positive constraint;
 a boundary constraint for mapping a first boundary of the first 2D representation to a second boundary of the second 2D representation; or
 a keypoint-based constraint.

16. The system of claim 9, wherein the surface mapping function is configured to map at least the first surface to each of a collection of surfaces, the operations further comprising:
 defining the distortion term pairwise for each of a plurality of mappings to provide a plurality of distortion terms; and
 adding the plurality of distortion terms for optimization.

17. A non-transitory computer-readable medium storing program code executable by a processor to perform operations, the operations comprising:
 a step for generating a surface mapping function for mapping a first surface of a first three-dimensional (3D) object in a 3D space to a second surface of a second 3D object in the 3D space, wherein the surface mapping function is defined by a first representation of the first surface, a second representation of the second surface, and a neural network model configured as an intermediary between the first representation and the second representation to map a first two-dimensional (2D) representation to a second 2D representation;
 selecting a set of points in the first 2D representation, the set of points comprising vertex points and internal points of a first 3D mesh, wherein:
  the first representation of the first surface is produced by minimizing a loss function defined based on Euclidean distances between (a) output points of the neural network model using the set of points as input and (b) ground-truth points of the set of points in the 3D space, so that the first representation of the first surface corresponds to a mapping from the first 2D representation of the first surface to the first surface of the first 3D object; and the second representation corresponds to a mapping from the second 2D representation of the second surface to the second surface of the second 3D object;

applying a feature of the first 3D mesh on the first surface to a second 3D mesh on the second surface to produce a modified second surface, wherein the first 3D mesh on the first surface maps to the second 3D mesh on the second surface as determined by the surface mapping function; and rendering the modified second surface.

18. The non-transitory computer-readable medium of claim 17, wherein the first representation of the first surface comprises a first neural network representation and the second representation of the second surface comprises a second neural network representation.

19. The non-transitory computer-readable medium of claim 18, wherein the operation of producing the first neural network representation comprises:

generating the first 2D representation based on the first 3D mesh of the first 3D object; and training the first neural network representation by adjusting the parameters of the first neural network representation to minimize the loss function;

wherein the first neural network representation has an input layer with two nodes representing two ordinates of a point in the first 2D representation and an output layer with three nodes representing three ordinates of a point in the 3D space.

20. The non-transitory computer-readable medium of claim 17, wherein the first representation of the first surface comprises a neural network representation and the second representation of the second surface comprises a differentiable function that maps the second 2D representation to the second 3D surface.

* * * * *